UNITED STATES PATENT OFFICE.

CHARLES ANTHONY BURGHARDT AND GILBERT RIGG, OF MANCHESTER, ENGLAND.

PROCESS OF OBTAINING METALLIC ZINC AND COPPER FROM ORES.

SPECIFICATION forming part of Letters Patent No. 585,355, dated June 29, 1897.

Application filed June 1, 1896. Serial No. 593,887. (No specimens.)

*To all whom it may concern:*

Be it known that we, CHARLES ANTHONY BURGHARDT, analytical chemist and professor of mineralogy in the Victoria University, residing at 35 Fountain Street, and GILBERT RIGG, analytical chemist, residing at 1 Ellesmere Grove, Eccles, Manchester, in the county of Lancaster, England, subjects of the Queen of Great Britain and Ireland, have invented certain new and useful Improvements in Processes of Obtaining Metallic Zinc and Copper from Ores Containing Zinc and Copper; and we do hereby declare the following to be a full, clear, and exact description of the invention, which will enable others skilled in the art to which it appertains to make and use the same.

Our invention relates to the recovery of metallic zinc from ores of zinc, or metallic zinc and metallic copper from zinc ores containing copper, or metallic copper from copper ores.

Referring in the first place to the treatment of ores containing zinc alone and zinc ores containing copper, the ore, whether cupriferous or otherwise, is first roasted to oxid in the usual manner, care being taken at the end of the roasting to so raise the temperature that any sulfate of zinc or sulfate of copper formed shall be decomposed and converted into the oxids of these metals. The thoroughly-roasted ore is now crushed into powder and placed in a suitable tank fitted with a mechanical stirrer or agitator. We then pour upon the crushed ore in the tank a concentrated solution of either the normal carbonate of ammonium, $(NH_4)2CO_3$, or the sesquicarbonate of ammonium, $(NH_4)2CO_3+2NH_4HCO_3$, or the bicarbonate of ammonium, $(NH_4HCO_3,)$ or mixtures of these, or a solution of ammonia-gas in water. We may here mention that where a solution of ammonia-gas in water is used there is no evolution of oxygen gas in the later stages of the process. Sufficient solution having been poured upon the ore in the tank, we next cover the surface of the liquid with a layer of paraffin-oil or other mineral oil of high flashing-point and low viscosity in order to prevent loss of ammonia by volatilization. The mechanical stirrer is now set in motion, so as to mix the powdered ore thoroughly with the solution. The oxid of zinc in zinc ores or in the case of zinc ores containing copper the oxids of zinc and copper are rapidly dissolved out of the ore powder by this treatment. The stirrer is then stopped and the solution allowed to settle, all undissolved mechanically-suspended matter falling to the bottom of the tank, or otherwise the undissolved matter may be separated by filtration. The solution is then run into another tank and again covered with a layer of oil, as in the first instance. We now treat the solution to remove from it any dissolved oxids of iron.

In the course of our investigations we have ascertained that small quantities of the oxids of iron are dissolved by the aforesaid carbonate of ammonium and solution of ammonia-gas in water, and this dissolved iron is highly detrimental in the subsequent electrolytic deposition of the zinc, causing it to fall from the negative pole in a spongy condition and reënter into solution, while any zinc which does remain on the negative pole always contains iron as an impurity. It is therefore essential to remove the oxids of iron from the solution, and to do this we add to the same, preferably at a temperature of about 40° centigrade, a proportion of hydrated oxid of tin obtained by any convenient and well-known chemical method, but by preference by oxidation of metallic tin with nitric acid and subsequent washing and drying of the product. After adding the hydrated oxid of tin to the solution it is kept well agitated by any suitable mechanical means, and in a few hours the iron in the solution is completely precipitated as oxid. The oxid of tin is then allowed to subside to the bottom of the tank and the clear solution is run into a fresh tank. To render the hydrated tin oxid again fit for service after it has become saturated with oxid of iron, it is placed in a suitable vessel and treated with sulfuric acid and washed with water, the iron passing into solution as sulfate. The iron might, however, be extracted from the solution by other means, although we at present consider the said hydrated oxid of tin to be the best agent for the purpose. In the case of zinc ores not containing copper the clear solution thus freed from iron is now ready for electrolysis in the depositing-tanks in the manner hereinafter described; but if the ore in the first place contained copper we first proceed to recover the copper from the solution by placing in the tank plates of metallic zinc or plates of metallic zinc and metallic tin in contact and acting as a couple. After immersion the copper begins to deposit upon the zinc in hard bright metallic scales and strips entirely free from oxid, owing to the exclusion of air by the layers of mineral oil. The solution is thus freed from its contained copper and is then run into the same tanks into which the solution is run when the ore being treated contains no copper, in which latter case the copper-extracting part of the process is omitted. In the zinc-depositing tanks the solution is subjected to electrolysis and is covered, as before, with a layer of oil and maintained at a temperature of about 40° to 50° centigrade.

We may here mention that the tanks used in out improved process after the solution has been freed from iron should be made of wood or of other suitable material, iron being excluded because of its hurtful effect upon the deposition of the zinc. In the electrodepositing-tanks the negative poles are made of sheet-zinc and the positive poles of tin, lead, or other metal not soluble in the liquor, or of carbon. Iron poles cannot be used for the reasons already given. Deposition of zinc at the negative pole and evolution of oxygen gas at the positive pole commence as soon as the circuit is closed in solutions prepared from the carbonates of ammonium, the zinc being deposited in the form of hard coherent sheets of bright metallic luster and easily separated from the negative pole. We have found that for every atom of zinc deposited on the negative pole one atom of oxygen gas is liberated at the positive pole.

No hydrogen gas is liberated during electrolysis. The oxygen gas is collected as it is evolved by the means usually employed to trap such gas in the manufacture of oxygen or by any other convenient means, the gas being washed with water to remove any traces of ammonia from it. It may here be repeated that no oxygen gas is evolved in a solution of ammonia-gas in water. The sheets of deposited zinc after removal from the negative poles are easily melted and cast into ingots or otherwise dealt with. The material remaining undissolved by the carbonate of ammonium solution or the solution of ammonia-gas in water is thoroughly washed with water under a layer of paraffin or other mineral oil to recover the contained solution of ammonium carbonates or ammonia and zinc oxids or zinc and copper oxids. After depositing the zinc out of the aforesaid solutions the exhausted liquor is run back into the first dissolving-tank upon another supply of roasted and ground ore, whereupon it becomes recharged with oxid of zinc or oxids of zinc and copper, as hereinbefore described, the processes set forth being then repeated.

In the case of ores containing copper alone the process for recovering the copper is similar to that already described with reference to the recovery of copper from zinc ores containing copper, the zinc-recovering part of the process by electrolytic deposition being of course omitted. The solutions employed are precisely of the nature already described in the foregoing part of the specification. The solution before being poured upon the roasted and ground copper ore in the first tank should receive an addition of from four thousand to five thousand grains of zinc to each gallon of the solution, the zinc being added by dissolving in the solution sufficient zinc oxid to obtain this result. The zinc oxid is added in order to prevent waste of metallic zinc used in recovering the copper and to induce the formation of hard copper.

If the solution contains no zinc, the metallic zinc used to precipitate the copper would dissolve rapidly in larger proportion than its equivalent to the copper, and the copper would be deposited in spongy form.

If treated first with zinc oxid, the copper oxid will be still dissolved out of the ore by the solution and much less zinc will be necessary to deposit the copper, while the formation of black and slimy copper will be to a great extent obviated.

As the presence of iron in the solution has no hurtful effect upon the formation of copper the process of removing iron from the solution by the use of hydrated oxid of tin may also be omitted. The solution might with advantage be heated to a temperature of about 40° centigrade. After the solution has been freed from copper by deposition on the zinc or zinc and tin plates (as already set forth in the case of the solution employed to treat cupreous zinc ores) it may be returned upon the powdered ore and a further proportion of copper recovered, and this may be repeated until thought requisite to reduce the quantity of contained zinc, which may be done by running the solution into depositing-tanks and reducing the amount of zinc by electrolysis, as hereinbefore described, to four thousand or five thousand grains per gallon.

The solution should in all cases be kept covered by a layer of paraffin or other mineral oil, as hereinbefore set forth.

We claim—

1. The improved process of recovering metallic zinc from zinc ores, which consists in treating the roasted and ground ores with an ammoniacal solution, then in precipitating the iron dissolved in the resultant liquid by the addition of hydrated oxid of tin, and in finally effecting the electrolytic deposition of the metallic zinc, all substantially as set forth.

2. The improved process of recovering metallic zinc and metallic copper from cupreous zinc ore, which consists in treating the roasted and ground ores with an ammoniacal solution, then in freeing the resultant liquid from iron dissolved by said solution, then in depositing the metallic copper on suitable metallic plates acting as a couple, and in finally effecting the electrolytic deposition of the metallic zinc, all substantially as set forth.

3. The improved process of recovering metallic copper from copper ores, which consists in treating the roasted and ground ores with an ammoniacal solution to which has been added a suitable proportion of zinc as described, then in depositing the metallic copper on suitable metallic plates acting as a couple, and from time to time recovering the zinc from the solution by electrolysis, substantially as set forth.

This specification signed and witnessed the 12th day of May, 1896.

CHARLES ANTHONY BURGHARDT.
GILBERT RIGG.

Witnesses:
JOSHUA ENTWISLE,
RICHARD IBBERSON.